United States Patent [19]
Philips

[11] 4,027,094
[45] May 31, 1977

[54] CONNECTOR HOUSING

[76] Inventor: Francis X. Philips, 50 E. 191 St., Bronx, N.Y. 10468

[22] Filed: Sept. 17, 1975

[21] Appl. No.: 614,340

[52] U.S. Cl. ................................. 174/48; 174/51
[51] Int. Cl.² ..................................... H02G 3/28
[58] Field of Search ............... 174/48, 49, 57, 51; 220/3.2–3.7; 52/221; 339/14 R

[56] References Cited
UNITED STATES PATENTS

| | | | |
|---|---|---|---|
| 2,033,602 | 3/1936 | Adam | 174/48 X |
| 3,153,118 | 10/1964 | Clark | 174/48 |
| 3,177,285 | 4/1965 | Hoskins | 174/48 |

Primary Examiner—Bruce A. Reynolds
Assistant Examiner—D. A. Tone
Attorney, Agent, or Firm—Philip Sands

[57] ABSTRACT

A non-metallic housing for electrical and/or telephone connectors having wires extending therefrom. The housing includes a cap having a pair of separable externally threaded portions defining an aperture therebetween. Each portion carries a part of the thread of the threaded portion and together form a circumferentially continuous external thread when in engagement with one another. When the separable portions are spaced from each other, the connector wires may be passed therebetween and positioned in the aperture of the cap. Threaded engagement of the externally threaded portion of the cap with the threads of a corresponding internally threaded opening maintains the separable portions in contact with one another so as to cover the opening while permitting the connector wires to extend through the aperture of the cap.

11 Claims, 7 Drawing Figures

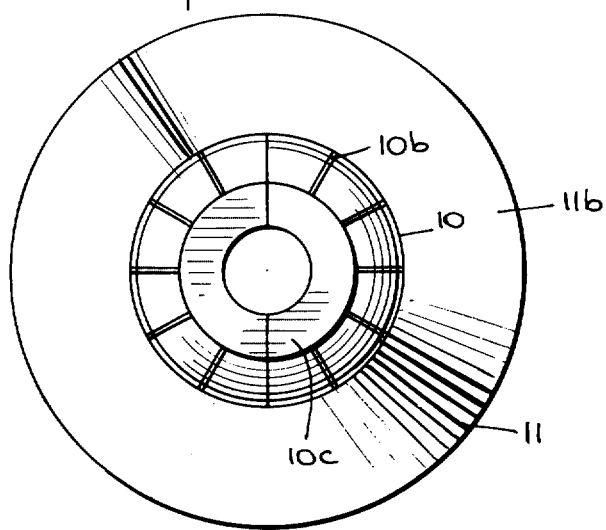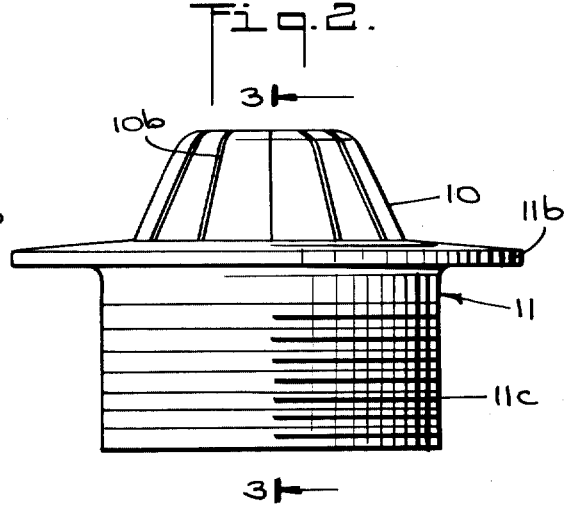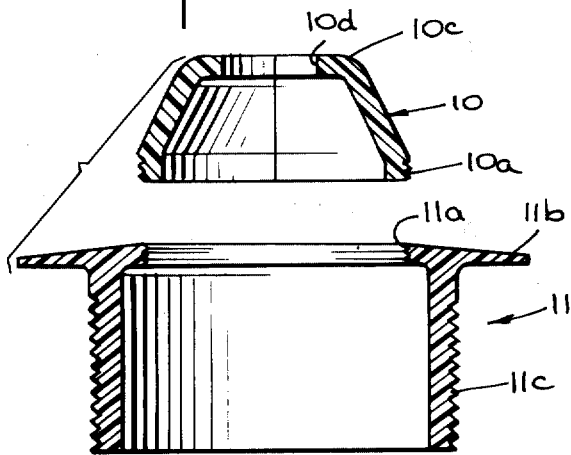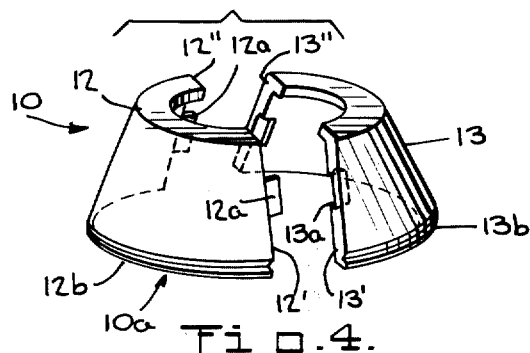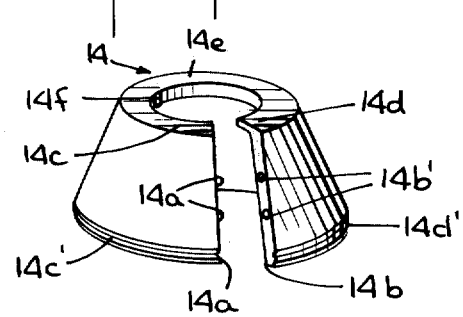

CONNECTOR HOUSING

The foregoing abstract is neither intended to define the invention disclosed nor is it intended to be limiting as to the scope in any way.

BACKGROUND OF THE INVENTION

This invention relates generally to a housing for a connector, and more particularly to a readily detachable housing for a telephone or electrical connector which is located at or beneath the surface of a floor or wall of a structure.

Generally, electrical power is distributed throughout buildings by providing conduits or ducts in the floors or walls of the structure and having the electrical wires extending therethrough. External appliances may be connected to these electrical supply lines, at convenient points along the conduits, by making holes in the floor or wall in registry with suitable openings in the conduit and positioning a receptacle therein to which the plug of an external appliance such as a lamp, an electric typewriter, etc. may be conveniently connected. Similarly, telephone wires are generally located in these conduits or ducts disposed in the walls or below the surface of the floor, and the telephone instruments are connected to these wires by means of jacks which are located in the floor openings.

As is well known in the art to which the invention relates, housings are required to protect the connector, i.e., the receptacle or the receptacle plug combination from damage and to prevent leakage of water into the receptacle and/or conduit while permitting the plug to be detached from the receptacle or outlet. In the past, these housings were made entirely of metal. Typically, such a housing included a metal sleeve mounted beneath the surface of the floor or wall and extending, in the opening in the floor, from the conduit toward the surface of the floor. A metal cap was provided for closing off the upper part of the sleeve. Such a cap normally extended above the surface of the floor or wall. The conventional metal caps were of one-piece construction with an opening in the center just large enough to permit the wires to pass therethrough but not large enough for the plug to be drawn through. This construction thus required the plug to be disassembled from the wires of the external appliance prior to each plugging and unplugging of the appliance. Thus, the wires would have to be threaded through the small opening in the metal one-piece cap and then reconnected to the plug so as to enable the cap to be installed on the sleeve after the plug was plugged into an outlet located at the interior of the sleeve. This type of assembly procedure impaired interchangeability of appliances with outlets, inasmuch as each time it was necessary to move an appliance plugged into a particular outlet, the plug had to be disconnected from the wire so as to permit removal of the metal cap therefrom. Then, the plug from the new appliance would have to be removed from its wire and the new wire threaded through the opening in the metal cap. The plug would then have to be reconnected to the wire at the other side of the cap.

The metal caps, in order to afford good mechanical protection against damage by vacuum cleaners, rug shampooers, etc., have to be machined from relatively heavy gauge metal and were quite expensive to manufacture. Furthermore, mating parts had to be machined highly accurately, at great cost, to assure that a fluid-tight seal would be obtained therebetween so as to prevent water from leaking into the electrical connectors and causing a short circuit while the floors were being washed or the rugs shampooed. In addition, in the event the wire insulation became frayed and worn through so as to expose the conductor, there was the risk that the conductor might contact the metal cap and cause a short circuit.

The metal caps were conventionally brass or steel and thus displayed the respective gold or silvery color of the metal. Since painting would have been expensive and would easily have chipped it was not economically feasible nor practical to match the color of the metallic cap with that of a rug, floor or wall on which it was mounted.

Accordingly, it is a primary object of the present invention to provide a housing for electrical and/or telephone connectors which will overcome the aforesaid disadvantages.

With more particularly, it is an object of the invention to provide a housing for electrical and/or telephone connectors which does not require removal of the plug or jack from its respective wire leads in order to permit the plug or jack to be assembled with the cap to the housing, thereby facilitating interchangeability.

Another object of the invention is to provide an improved housing of the above type made from a material which may be readily obtained in any desired color so as to match the carpeting or other flooring on which it is mounted.

A related object of the invention is to provide a housing for electrical and/or telephone connectors which is made from an electrically insulating material forming a sturdy mechanical structure providing a substantially fluid-tight seal with mating parts.

Still another object of the invention is to provide a housing which is provided with means for supporting and electrically grounding an electric plug-receiving receptacle when such a receptacle is used, and which means also can be used for supporting a telephone jack or the like when such a jack is to be used in lieu of the aforementioned receptacle.

An additional object of the invention is to provide an improved housing in common for electrical and/or telephone connectors which is capable of being mass produced in a manner which requires little or no machining, and which is substantially less expensive to fabricate than conventional in-floor housings.

Further objects and advantages of this invention will become apparent as the following description proceeds.

SUMMARY OF THE INVENTION

Briefly stated, and in accordance with the invention there is provided a non-metallic housing for electrical and/or telephone connectors having wires extending therefrom.

In the preferred embodiment, the housing includes cap means comprising a pair of separable portions which together define a circumferentially extending externally threaded portion. The pair of portions are separable along a pair of surface means which extend in adjacency to each other generally transversely to the threads of the threaded portion and which together define an aperture in the cap means which is located inwardly from said externally threaded portion. When the separable portions are spaced apart from one another connector wires may be passed therebetween and positioned in the region of an extending through the aperture.

Each of the pair of portions of the cap means has a part of the threaded portion of the cap means located thereon. The parts of the threaded portion disposed on the pair of portions are adjacent to one another, so as to form a circumferentially continuous thread, when the surface means are in engagement with one another. One of the surface means includes protruding means positioned thereon in a predetermined relation with respect to the corresponding one of the threaded parts. The other surface means includes a recess means positioned therein in a predetermined relation with respect to the other of the threaded parts. The protruding means is adapted to cooperate with the recess means in response to engagement of the pair of surface means with one another for placing the threaded parts in registry, whereby the threaded means becomes circumferentially continuous.

The threaded means of the cap means is thereby adapted to be threadedly engaged with a member having an internally threaded opening of corresponding size, whereby the pair of separable portions of the cap means are maintained in engagement with each other along the surface means and forms a unitary member which covers said opening while permitting the wires of the connector to extend therethrough.

In accordance with a further aspect of the invention there is provided an embodiment of the cap means which includes a pair of hollow half-hemispherically shaped separable members. Each of the separable members is provided with surface means adapted to mate with corresponding surface means of the other separable member so as to form the thread parts carried by each separable member into a circumferentially continuous external thread when the separable members are in engagement with one another along the surface means thereof. The separable members are maintained in contact with one another along the surface means by threadedly engaging the cap means with the internally threaded opening in the member.

According to another embodiment of the invention there is provided a cap means in the form of a unitary C-shaped member having a resiliently deformable central portion. The opposed ends of the C-shaped member respectively include separable threaded portions which are adapted to be placed into and out of engagement with one another in response to the deformable portion thereof being deformed. When the opposed ends are in engagement along the surface means forming the interface therebetween, a circumferentially continuous external thread is formed. With the externally threaded portion of the cap means threadedly engaging the internal threads in the wall of the opening of the member, so as to cover the opening, the portions of the cap means are maintained in engagement. The connector wires extend through an aperture formed in the C-shaped member between the separable portion.

The aforementioned embodiments are contemplated to be used in conjunction with an electrically conductive ring which is adapted to support and electrically ground an electric plug-receiving receptacle in a mounting conduit which is to be closed by the embodiments of the aforementioned cap means.

BRIEF DESCRIPTION OF THE DRAWINGS

Other objects and advantages of the invention will become apparent upon reading the following detailed description and upon reference to the drawings, in which:

FIG. 1 is a plan view of the preferred embodiment of the invention;

FIG. 2 is an elevational view of the embodiment shown in FIG. 1;

FIG. 3 is a vertical sectional view taken along the line 3—3 of FIG. 2 in the direction of the arrows but showing the parts detached from each other for the sake of clarity;

FIG. 4 is an exploded perspective view of the preferred embodiment of the cap means of the invention;

FIG. 5 is a perspective view of another embodiment of the cap means of the invention;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 6:
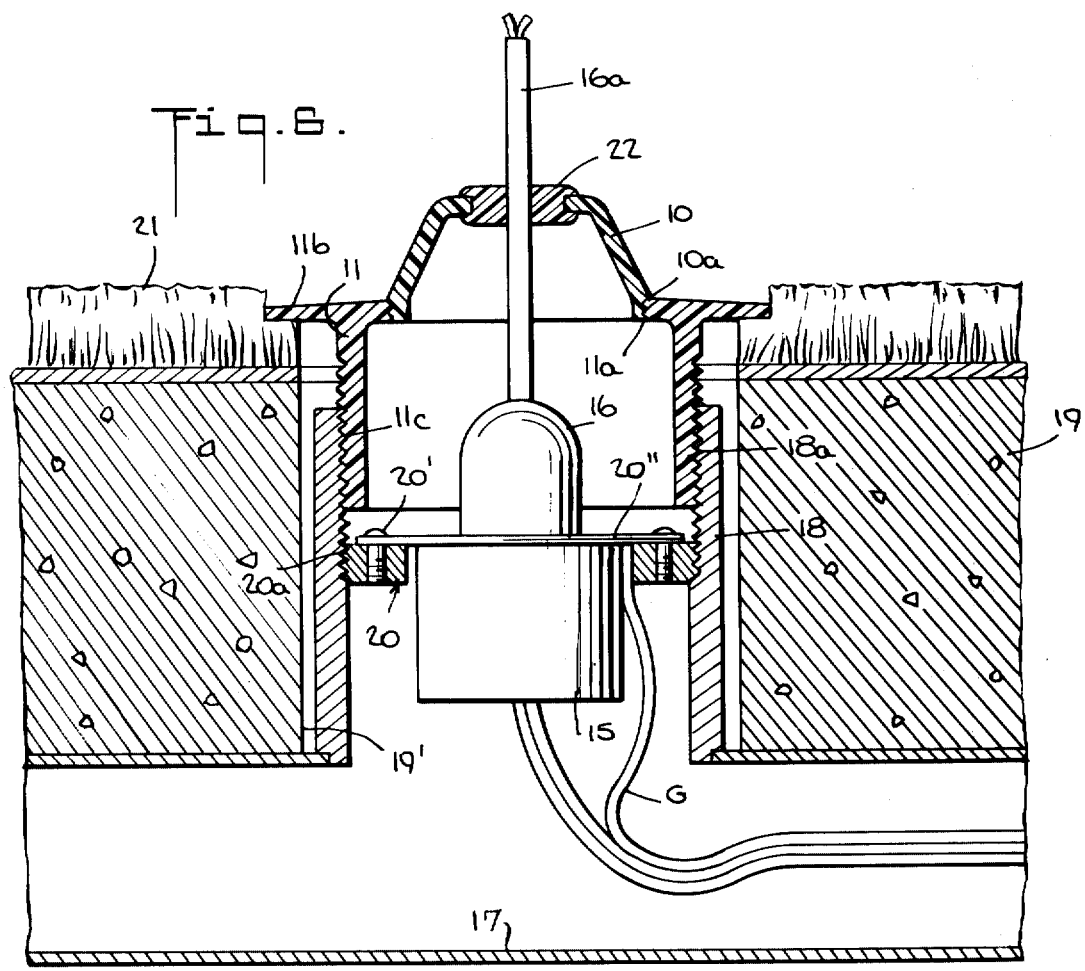
FIG. 6 is a vertical sectional view of an assembly, according to the present invention, in place, in an opening in the carpeted flooring of a building.

With continued reference to the drawings, wherein like reference numerals have been used throughout to designate like elements, FIGS. 1 through 6, inclusive, illustrate the invention as including a generally cup-shaped cap means 10 and a generally cylindrical sleeve means 11. In FIGS. 1 and 2, the cap means 10 is shown in threaded engagement with the sleeve means 11. However, it will be understood that the cap means 10 could be in threaded engagement directly with a corresponding internally threaded opening in a member, e.g., the floor of a structure or, if suitably modified, the wall thereof. The cap means 10 includes an externally threaded portion 10a (FIG. 3) adapted to engage the internally threaded portion 11a of the sleeve means 11 or alternately, where a floor member itself is provided with an internally threaded opening of suitable size, the cap means 10 would be threadedly received directly in such opening of such member, therey eliminating the need for sleeve means 11. Normally, the opening of the member will not be threaded and the sleeve means 11 will therefore be required. Thus, as is shown in FIG. 2, the second end portion, i.e., upper portion of the sleeve means has an internally threaded portion 11a which is adapted to engage the externally threaded portion 10a of the cap means 10. The sleeve means 11 is also provided with a radially outwardly extending annular flange 11b, at the upper or second end portion thereof, which exceeds the diameter of the opening in the floor or wall. The first end portion, i.e., the other axially spaced end portion of the sleeve means 11 has an externally threaded portion 11c thereon which is adapted to engage a corresponding internally threaded portion 18a of tubular mounting means 18 (FIG. 6).

Referring now to FIG. 2, the cap means 10 preferably has a plurality of exterior raised (or depressed) radial splines 10b thereon. The splines 10b extend from the threaded portion 10a to the uppermost portion 10c of the cap means 10 so as to enable one to easily grip the cap means 10 and apply a torque thereto for threadedly engaging it with the housing means 11. In addition, as shown in FIGS. 1 and 3, the uppermost portion 10c of the cap means 10 is provided with a preferably circular through-opening or aperture 10d located inwardly of the externally threaded portion 10a. The wires connecting a telephone jack or electrical plug extend through the aperture 10d in the uppermost portion 10c of the cover 10. This permits desired electrical or telephone equipment to be connected to the cables located in conduit 17 (FIG. 6) disposed below the surface of the floor.

According to the preferred embodiment of the invention, the cap means 10, as depicted in FIG. 4, is preferably formed of two generally semi-circular shaped member 12 and 13, which are attachable to and separable from each other along a pair of surface means 12' and 13', respectively, located generally transverse to the externally threaded means 10a thereof. The separable portions 12 and 13 include a part (12b and 13b, respectively) of the circumferentially extending externally threaded means 10a, and a set of surface means 12', 12'' and 13', 13'' respectively. Each of the pair of surface means 12' and 12'' of the first member 12 has a protruding means or lip 12a, preferably of generally rectangular shape extending therefrom toward the second member 13. Both of the lips 12a of the pair of surface means are in a predetermined relation with the threaded portion 12b located on the first member 12. Similarly, the second member 12 includes a portion thereof defining a part 13b of the circumferentially extending externally threaded portion 10a, and a pair of surface means 13' and 13''. Each of the pair of surface means 13' and 13'' of the second member 13 has recess means 13a or slots of preferably generally rectangular shape therein for mating with the corresponding one of the lips 12a of the first member 12. Each of the slots 13a is in a predetermined relation with the threaded portion 13b located on the second member 13. The slots 13a are cooperable with the lips 12a in response to engagement of the surface means 12', 13' and 12'', 13'' with each other, for placing the threaded portion 13b in registry with the threaded portion 12b so as to form a circumferentially continuous thread 10a adapted to be threadedly engaged with the internally threaded portion 11a of the sleeve means 11.

In use, the wire on which the telephone jack or electric plug of the apparatus to be plugged in is located will be placed between the portions 12 and 13, with the latter in spaced conditions as seen in FIG. 4. The portions 12 and 13 are thereupon mated by pressing the latter toward each other so that the pair of lips 12a engage the corresponding slots 13a. In response thereto, the surface means 12', 13', and 12'', 13'' engage each other so as to form a unitary cap means having an aperture in the uppermost portion thereof. The wires connected to the plug or jack extend through the aperture in such manner that the plug is located on one side, namely the underside of the cap means while the equipment to be operated is located on the other side of the cap means. After connecting the plug to a suitable outlet 15 provided in or beneath the sleeve 11, the cap means 10 may be threadedly engaged with the internally threaded portion 11a of the housing means 11, whereby the pair of portions 12 and 13 are maintained in engagement along their respective surface means.

Each portion 12 and 13, of the cap means is preferably formed by molding substantially high impact resistant material which is an electrical insulator and also is substantially fire resistant. This material is preferably a suitable synthetic plastic, for example, a polyaryl ether sold under the trademark Arylon by Uniroyal, Inc. A pigment may be readily added to this material prior to molding so as to obtain substantially any desired color, whereby the cap means may be color matched to the carpeting which may be present on the floor in which it is used. The material is preferably sufficiently deformable so as to form a fluid-tight seal between mating parts 12, 13 and 11 when the cap means is threadedly engaged by the sleeve means. Furthermore, the portions 12 and 13 may be molded in essentially final form and therefore require little or no additional machining.

Turning now to FIG. 5, there is shown an alternate cap means 14 in the shape of a unitary C-shaped member. The cap means 14 includes a pair of separable portions 14c and 14d each of which includes one part 14c' and 14d', respectively, which together define a circumferentially extending external thread. The portions 14c and 14d have corresponding surface means 14a and 14b which are separable along a plane generally transverse to the thread parts 14c' and 14d'. The surface means 14a has protruding means which may be in the form of a pair of generally cylindrical pins 14a' extending therefrom toward the other surface means 14b. The pins 14a' are in a predetermined relation with the thread part 14c' located on the portion 14c. The other surface means 14b has recess means in the form of a pair of generally circular bores 14b'. The bores 14b' are in a predetermined relation with the thread part 14d' located on the portion 14d. The cap means 14 has a central portion 14e which is resiliently deformable so that by deforming the cap means 14 the surface means 14a and 14b may be placed into and out of engagement with one another. The surface means 14a and 14b communicate with and together define an aperture 14f located inwardly of the externally threaded portion so that with the surface means 14a and 14b spaced from each other, the wires of a connector may be passed therebetween and positioned in the aperture. In addition, the bores 14b' are cooperable with the pins 14a', in response to moving of the surface means toward each other, for placing the thread part 14d' into registry with the thread part 14c' so as to form a circumferentially continuous thread adapted to be threadedly engaged with the internally threaded portion 11a of the sleeve means 11.

It is evident that through use of the cap means 14 of the present invention a telephone jack or electric plug may remain connected to its associated wires during assembly to the cap means. Thus, the jack or plug remains connected to its wires while the latter are inserted between the spaced surface means 14a and 14b of the cap means 14 and positioned in the aperture thereof. Then, the spaced surface means of the cap means 14 are pressed toward each other and the pins 14a' are received in the corresponding bores 14b' so as to assure that the surface means are in engagement with one another and that the threaded portions 14c' and 14d' are in registry so as to form a continuous thread 10a. The cap means, with the wires now extending therethrough, is now ready to be threadedly engaged with the sleeve means 11, thereby locking the portions 14c and 14d in engagement with one another and forming a substantially fluid-tight seal between corresponding mating parts 11, 14c and 14d.

It will be understood that the alignment means shown in FIG. 5 and the lip-slot means shown in FIG. 4 may be interchanged and that variations of these may be utilized within the scope of the present invention. In all of the aforementioned embodiments, the portions of the cap means mating along the surface means are locked in engagement when the cap means threadedly engages the sleeve means.

As best shown in FIG. 6, flooring 19 is provided with an in-floor conduit 17 extending thereunder. An opening 19' in the flooring is formed in alignment with an opening in the upper wall of conduit 17 so as to provide access to the electrical and/or telephone cables in the latter. In use a tubular mounting means 18 is suitably connected to the conduit 17 in the region of the opening therein. The mounting means 18 preferably extends from the conduit 17 through the preferably circular opening 19' in the flooring. The mounting means 18 has at its upper end spaced from the conduit 17, an internally threaded portion 18a which is adapted to engage the externally threaded portion 11c of the sleeve means 11. In use, the sleeve means 11 is screwed into the mounting means 18 until the flange 11b of the sleeve means 11 depresses the portion of the carpeting 21 which surrounds the opening 19'.

A preferably annular support means or ring 20, having an externally threaded portion 20a is threadedly engaged with the internally threaded portion 18a of the mounting means 18 prior to insertion of the sleeve means 11, and provides an inwardly extending support for the outlet device or plug-receiving receptacle 15 and the plug 16 which will be later connected thereto, as shown. The support means 20 may be positioned at any selected location below the upper surface of the flooring 19 and is adapted to have secured thereto the outlet device 15, such as by screws 20' holding a transverse plate or bracket 20" to which the receptacle 15 is suitably fastened.

The ring 20 not only serves as a vertically adjustable support for the receptacle 15 so that regardless of the length of the plug 16 (whether it be a plug for a telephone or an electrical plug) the cap means 10 can be maintained at a selected distance over the flooring, but the ring 20 also serves as a means for electrically grounding the receptacle 15 when the latter is to provide electricity.

In this respect, the ring 20 is preferably a single piece of electrically conductive material and electrically couples the bracket 20" (which is also electrically conductive) with the metallic mounting means 18. As a result, when the receptacle 20 has associated therewith an electrical ground wire G, which in a conventional manner has one end electrically coupled with the bracket 20", the mere coupling of the bracket 20" with the ring 20 serves to enable the latter to serve as an electrical grounding conduit between the receptacle 20 and the mounting means 18. Thus, the ring 20 has the dual function of supporting and electrically grounding an electric receptacle at any selected distance beneath a flooring.

Figure 7:
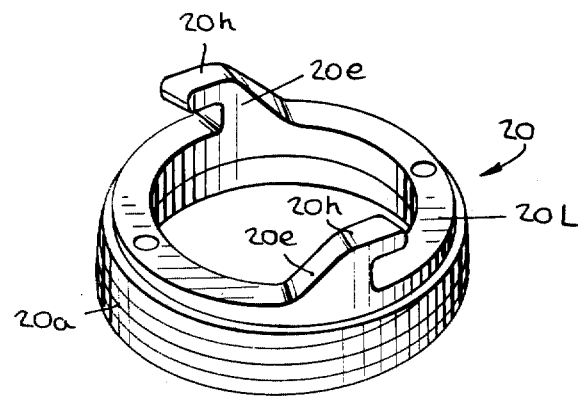
FIG. 7 is a perspective view of the electrical grounding ring of the present invention.

In order to facilitate the connection of the ring 20 in the mounting means 18, the ring 20 is provided with a pair of diametrically opposite lugs 20e (FIG. 7) each terminating in a respective head 20h extending in opposite horizontal directions above (and spaced from) the upper annular ledge 20L of the ring 20. As a result, the head of a T-shaped tool (not shown) can be inserted beneath each of the heads 20h and turned so that the ring 20 is threaded into placed in the mounting means 18. It will be understood that the heads 20h also serve as abutment means for limiting the maximum downward disposition of the cap means 10 so that the latter is spaced and prevented from damaging the receptacle 15.

In use, the opening 19' (FIG. 6) may be drilled in the flooring in registry with an already existing opening in the upper wall of conduit 17. A splice is then made to the desired cables in conduit 17 and a suitable receptacle 15 is connected to the spliced cables. A mounting means 18 is then suitably fastened, as by threads or screws, to conduit 17 and the ring 20 is inserted thereinto. Next, the receptable 15 is suitably securely mounted on the support 20 by e.g., a plate 20" and screws 20'. Then the sleeve means 11, according to the invention, is threadedly secured to the mounting means 18 in such a manner that the portion of the carpeting 21 which surrounds opening 19' is depressed by the flange 11b of sleeve 11. Then the wire 16a having the plug 16 at one end thereof and an electrical or telephone appliance at the other end thereof, is positioned in a split annular collar or grommet 22, preferably of elastomeric material, such as rubber. The rubber grommet 22 is then, together with the wires 16a passing therethrough, placed between the separated portions 12 and 13 of the cap means 10.

The split grommet 22 has an inner opening to permit the connector wires 16a to extend therethrough, and an outer diameter corresponding to the diameters of the aperture of the cap means 10 so as to form a fluid-tight seal between the connector wires 16a and the cap means 10 when the surface means of the cap means 10 are in engagement with one another. The cap means 10 is then assembled around the grommet by pressing the portions 12 and 13 together as previously described. The wire 16a now extends through the aperture of the cap means 10 being tightly gripped therein by the grommet 22. With the portions 12 and 13 hand held in mating relationship the threaded portion 10a of the cap means 10 may be screwed into the portion 11a of the sleeve 11. This results in locking of the separable portions 12 and 13 together. A substantially fluid-tight seal is formed between the sleeve means and the cap means as a result of slight local deformation in the mating threaded portion of both the cap means and the sleeve means.

When the outlet device 15 is to be out-of-service i.e. no plug 16 connected thereto, the cap means 10 may be replaced by a flat plate (not shown) having an externally threaded portion for engaging the sleeve means. The flat plate, which may also be a color matched plastic material, may be provided with a central recess for a key, the use of which enables it to be threaded into the sleeve means.

It is clear from the foregoing description, therefore, that the herein described housing achieves the objectives of the present invention. The housing of this invention readily permits a telephone jack or electrical plug to be disconnected from an outlet device and a new one connected thereto without disassembling the plug or jack from its wire. In order to make or break the connection between the jack or plug and the outlet device, it is only necessary to unscrew the cap means and separate the separable portions thereof so as to be able to remove the wire intact with its plug. This type of arrangement readily permits equipment to be interchanged with other equipment.

Since the heretofore described housing is molded, preferably of a synthetic plastic, it is relatively simple and inexpensive to add any desired color pigment to the synthetic plastic so as to obtain a housing matching the color of the carpeting with which it is to be used. Furthermore, this material is easily molded by a process which readily lends itself to mass production and requires practically no subsequent machining, thereby substantially reducing manufacturing costs. The resultant housing is electrically insulating and displays high resistance to impact and fire. Furthermore, the housing forms a substantially fluid-tight seal about the plug or jack and the corresponding outlet device so as to prevent fluid from leaking into the outlet device and causing a short circuit. A housing of this type may be readily used maintenance-free over extended periods of time. Thus it is apparent that there has been provided, in accordance with the invention, a housing that fully satisfies the objects, aims and advantages previously set forth.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. In combination, internally threaded cylindrical mounting means for attachment to flooring in an axially vertical disposition with an upper open end, an electrically conductive ring having external threads corresponding to that of said mounting means and a generally annular ledge, said ring being vertically adjustable threadedly in said mounting means so that the position of said annular ledge is at any selected position beneath said upper open end of said mounting means, an electric plug-receiving receptacle, connecting means for detachably securing and electrically grounding said electric plug-receiving receptacle through said ring and to said annular ledge such that said ring surrounds and electrically grounds said receptacle and exposes the latter to said upper open end of said mounting means, and cap means for closing said upper open end of said mounting means and having an aperture through which electrical wiring terminating in a plug is disposable to be connected to said receptacle, said ring including projection means extending axially of said annular ledge for engaging and limiting the maximum downward disposition of said cap means with respect to said upper open end of said mounting means.

2. The combination as claimed in claim 1, wherein said projection means includes a pair of upstanding lugs each terminating in a respective head overlying in spaced relation said annular ledge.

3. The combination as claimed in claim 2, wherein said lugs are diametrically opposite one another and said heads extend in opposite horizontal directions.

4. The combination as claimed in claim 1, wherein said ring is in one piece and constituted entirely of metal.

5. The combination as claimed in claim 1, wherein said connecting means includes an electrically conductive bracket affixed to said receptacle, a ground wire having one end electrically connected to said bracket, and means for electrically connecting said bracket to said annular ledge of said ring.

6. The combination as claimed in claim 5, wherein the latter said means includes a pair of screws, said bracket terminating in a pair of eyelets for receiving said screws respectively, said annular ledge having a pair of diametrically opposite threaded openings for threadedly receiving said screws respectively.

7. The combination as claimed in claim 1, wherein said cap means comprises a unitary C-shaped member having a resiliently deformable central portion, the opposed ends of said C-shaped member being separable and adapted to be placed into and out of engagement with each other in response to deforming of said deformable portion.

8. The combination as claimed in claim 1, wherein said cap means includes a first member having a cylindrical externally threaded body to be threadedly inserted into said upper open end of said mounting means and an annular flange of increased diameter to cover carpeted flooring surrounding said mounting means, and a second member of frusto-concial shape, said second member having external threads, said first member in the region adjacent to said flange having internal threads for threadedly receiving said external threads of said second member.

9. The combination as claimed in claim 8, wherein said second member is comprised of two mating portions which when together establish said frusto-conical shape thereof and said external threads in continuous helical form.

10. The combination as claimed in claim 9, wherein said two mating portions when together have an upper narrow region defining said aperture through which electrical wiring terminating in a plug is disposable.

11. The combination as claimed in claim 10, wherein said two mating portions along their common parting surfaces include tongue-and-groove means for aligning said two mating portions with one another.

* * * * *